US008054814B2

(12) United States Patent
Jun et al.

(10) Patent No.: US 8,054,814 B2
(45) Date of Patent: *Nov. 8, 2011

(54) SYSTEM AND SIGNALING METHOD FOR INTERWORKING WIRELESS LAN AND PORTABLE INTERNET

(75) Inventors: Sun-Mi Jun, Daejeon (KR); Kyung-Soo Kim, Daejeon (KR); Jee-Hwan Ahn, Daejeon (KR); Song-In Choi, Daejeon (KR); Dong-Soo Jung, Daejeon (KR); Byoung-Chun Jeon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 862 days.

This patent is subject to a terminal disclaimer.

(21) Appl. No.: 11/926,336

(22) Filed: Oct. 29, 2007

(65) Prior Publication Data
US 2008/0130600 A1 Jun. 5, 2008

(30) Foreign Application Priority Data

Dec. 1, 2006 (KR) .................. 10-2006-0120740
Apr. 11, 2007 (KR) .................. 10-2007-0035626

(51) Int. Cl.
*H04W 4/00* (2009.01)
*H04J 3/16* (2006.01)
(52) U.S. Cl. ............... 370/338; 455/432.1; 370/466
(58) Field of Classification Search .......... None
See application file for complete search history.

(56) References Cited

U.S. PATENT DOCUMENTS
2005/0153692 A1 7/2005 Hwang et al.

| 2006/0019669 | A1* | 1/2006 | Moon et al. .......... 455/447 |
| 2006/0128362 | A1 | 6/2006 | Bae et al. |
| 2006/0209882 | A1* | 9/2006 | Han et al. .......... 370/465 |
| 2006/0223526 | A1* | 10/2006 | Qi et al. .......... 455/432.1 |
| 2006/0268802 | A1 | 11/2006 | Faccin |

(Continued)

FOREIGN PATENT DOCUMENTS
KR 2003-0071981 9/2003
(Continued)

OTHER PUBLICATIONS

Office Action issued by Korean Intellectual Property Office on Dec. 19, 2008.

*Primary Examiner* — Gary Mui
*Assistant Examiner* — Clemence Han
(74) *Attorney, Agent, or Firm* — Kile Park Goekjian Reed & McManus PLLC

(57) ABSTRACT

Disclosed is an interworking device for interworking with a first network and supporting signaling between a terminal and a second network. The interworking device sets a first wireless data path with the first network. The interworking device sets a first radio link with the terminal, receives an authentication message through a first radio link, and transmits the authentication message to an authentication server of the second network through the first wireless data path. When the authentication server finishes authentication, the interworking device sets a second wireless data path with the terminal. Accordingly, the interworking device provides an Internet service to the terminal during movement.

14 Claims, 8 Drawing Sheets

U.S. PATENT DOCUMENTS

| | | | |
|---|---|---|---|
| 2007/0021119 A1* | 1/2007 | Lee et al. | 455/436 |
| 2007/0025297 A1* | 2/2007 | Lee et al. | 370/331 |
| 2007/0160017 A1* | 7/2007 | Meier et al. | 370/338 |
| 2008/0102843 A1* | 5/2008 | Todd et al. | 455/445 |
| 2008/0112362 A1* | 5/2008 | Korus | 370/331 |
| 2008/0112363 A1* | 5/2008 | Rahman et al. | 370/331 |
| 2009/0149157 A9* | 6/2009 | Gallagher et al. | 455/414.1 |

FOREIGN PATENT DOCUMENTS

| | | |
|---|---|---|
| KR | 10-2005-0061250 A | 6/2005 |
| KR | 10-2006-0000830 | 1/2006 |
| KR | 10-2006-0097725 | 9/2006 |
| KR | 10-2007-0076327 | 7/2007 |
| WO | WO 2005/039114 A1 | 4/2005 |

* cited by examiner

SYSTEM AND SIGNALING METHOD FOR INTERWORKING WIRELESS LAN AND PORTABLE INTERNET

CROSS-REFERENCE TO RELATED APPLICATION

This application claims priority to and the benefit of Korean Patent Applications No. 10-2006-0120740 filed in the Korean Intellectual Property Office on Dec. 1, 2006 and No. 10-2007-0035626 filed in the Korean Intellectual Property Office on Apr. 11, 2007, the entire contents of which are incorporated herein by reference.

BACKGROUND OF THE INVENTION (a) Field of the Invention

The present invention relates to an Internet service providing method and a device. Particularly, the present invention relates to a method and device for providing an Internet service to a wireless local area network (WLAN) terminal.

This work was supported by the IT R&D program of MIC/IITA[2006-S-009-01, The Development of WiBro Service and Operating Standard].

(b) Description of the Related Art

A wireless local area network (WLAN) system for providing a wireless Internet service using a WLAN requires a WLAN terminal, a wireless local area network access point (WLAN AP) connected to the WLAN terminal through a radio link, and an Internet connected to the WLAN AP through a cable. In this instance, the Internet includes an authentication, authorization, accounting (AAA) server for authenticating a WLAN subscriber, and a dynamic host configuration protocol (DHCP) server for allocating an IP address to the authenticated subscriber.

The wireless Internet service provided by the above-noted WLAN system advantageously provides a high-quality very fast Internet service with high data rates and small packet loss, but the service is available within the coverage of the WLAN AP and no service is available during movement.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a wireless Internet service to a wireless local area network (WLAN) terminal in an area out of the coverage of a WLAN AP.

In one aspect of the present invention, a method for interworking with a first network and supporting signaling to a terminal of a second network includes: setting a first wireless data path following a first wireless communication protocol with the first network; setting a first radio link following a second wireless communication protocol with the terminal; receiving an authentication message through the first radio link; transmitting the authentication message to an authentication server of the second network through the first wireless data path so that the authentication server of the second network may authenticate the terminal; and setting a second wireless data path following the second wireless communication protocol with the terminal when the authentication process performed by the authentication server of the second network is finished. The first wireless communication protocol supports a handover, and the second wireless communication protocol does not support a handover. The method includes: receiving a first address allocation message through the second wireless data path; transmitting the first address allocation message to an address allocation server of the second network through the first wireless data path so that the address allocation server of the second network may allocate a first network address for the terminal; receiving the first network address through the first wireless data path; and transmitting the first network address to the terminal through the second wireless data path. The method further includes transmitting a second address allocation message to an address allocation server of the first network through the first wireless data path to allow the address allocation server of the first network to allocate a second network address, and receiving the second network address through the first wireless data path. The setting of the first wireless data path includes: setting a second radio link following the first wireless communication protocol with a base station of the first network; transmitting the first network authentication message to the authentication server of the first network through the second radio link to allow the authentication server of the first network to perform an authentication process; and setting the first wireless data path following the first wireless communication protocol with the first network when the authentication process performed by the authentication server of the first network is finished. The transmitting of the authentication message to the authentication server of the second network includes transmitting the authentication message to the authentication server of the second network through the first wireless data path by passing it through the first network, and the transmitting of the first address allocation message to the address allocation server of the second network includes transmitting the first address allocation message to the address allocation server of the second network through the first wireless data path by passing it through the first network. The method includes: transmitting the second address allocation message to an address allocation server of the first network through the first wireless data path to allow the address allocation server of the first network to allocate the second network address; receiving the second network address through the first wireless data path; transmitting the second address allocation message to the address allocation server of the second network through the first wireless data path by passing it through the first network to allow the address allocation server of the second network to allocate a third network address; and receiving the third network address through the first wireless data path. The setting of the first wireless data path includes: setting a second radio link following the first wireless communication protocol with the base station of the first network; transmitting the first network authentication message to the authentication server of the first network through the second radio link to allow the authentication server of the first network to perform an authentication process; and setting the first wireless data path following the first wireless communication protocol with the first network when the authentication process performed by the authentication server of the first network is finished. The transmitting of the authentication message to the second network includes designating a destination address of the authentication message as a network address of the authentication server of the second network, and designating a path so that the authentication message may be passed through the first network through the first wireless data path. The transmitting of the address allocation message to the second network includes designating a destination address of the address allocation message as a network address of the address allocation server of the second network, and setting a path so that the address allocation message may be passed through the first network through the data path. In another aspect of the present invention, a system for interworking a first network and connecting a second network and a terminal includes: a base station connected to the first network through a cable, and transmitting/receiving signals through a radio channel; a first network authentication server for authenticating the first network; a second network authentication server for authenticating the second network; and an interworking device for setting a first wireless data path following a first wireless communication protocol with the first network through the base station, and setting a second wireless data path following a second wireless communication protocol with the terminal. The system includes a first network address allocation server for allocating a first network address for the interworking device, and a second network address allocation server for allocating a second network address for the terminal. The interworking device includes: a first matcher for setting a first wireless data path with the first network; a second matcher for setting a second wireless data path with the terminal; and an interworker for controlling the first matcher to set the first wireless data path and controlling the second matcher to set the second wireless data path through the first wireless data path. The first matcher transmits a first authentication message to the first network authentication server according to control by the interworker, and sets the first wireless data path with the first network when the first network authentication server finishes the authentication process according to the first authentication message. The second matcher receives a second authentication message from the terminal, transmits the second authentication message to the second network authentication server through the interworker by passing it through the first network, and sets the second wireless data path with the terminal when the second network authentication server finishes the authentication process according to the second authentication message. The interworker includes an authentication client for requesting the first network authentication server to authenticate the first matcher through the first authentication message, and an authentication relay for transmitting the second authentication message to the second network authentication server through the first wireless data path by passing it through the first network. The interworker includes an address allocation client for requesting the first network address allocation server to allocate a network address for the first matcher through the first wireless data path, and an address allocation relay for transmitting an address allocation message to the second network address allocation server through the first wireless data path by passing it through the first network when the second matcher receives the address allocation message from the terminal through the second wireless data path.

DETAILED DESCRIPTION OF THE EMBODIMENTS

Figure 1:
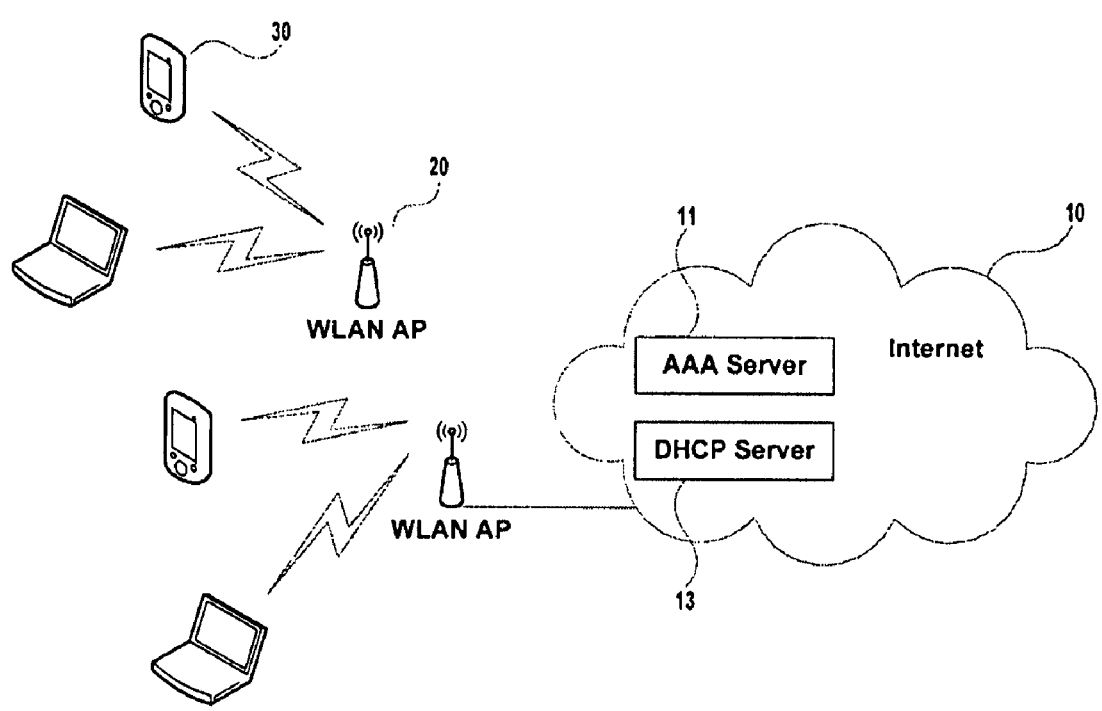
FIG. 1 shows a schematic diagram for a wireless Internet.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprising" or variations such as "comprises" will be understood to imply the inclusion of stated elements but not the exclusion of any other elements. Also, the terms of a unit, a device, and a module in the present specification represent a unit for processing a predetermined function or operation, which can be realized by hardware, software, or combination of hardware and software.

A system and method for interworking a wireless local area network (WLAN) and a portable Internet according to an exemplary embodiment of the present invention will now be described with reference to drawings.

A configuration of a wireless Internet will be described with reference to FIG. 1.

FIG. 1 shows a schematic diagram for a wireless Internet.

As shown in FIG. 1, the wireless Internet includes an Internet 10 and a wireless local area network access point (WLAN AP) 20, and communicates with a terminal 30 through a radio channel.

The Internet 10 manages the wireless local area network (WLAN) AP 20 and provides an Internet service to the terminal 30 through a wired channel. The Internet 10 includes an authentication authorization accounting (AAA) server 11 for authenticating the terminal 30 having requested the Internet service, and a dynamic host configuration protocol (DHCP) server 13 for allocating an IP address to the authenticated terminal 30.

The wireless local area network (WLAN) AP 20 has a unique wireless communication area, and provides an Internet service of the Internet 10 to the terminal 30 when the terminal 30 is connected to the WLAN AP 20. In this instance, the WLAN AP 20 can be described by various terms such as a base station or a repeater.

The terminal 30 is a communication device for connecting to the wireless Internet through a radio channel and receiving an Internet service from the Internet 10.

A system to which an interworking device is applied according to an exemplary embodiment of the present invention will now be described with reference to FIG. 2.

Figure 2:
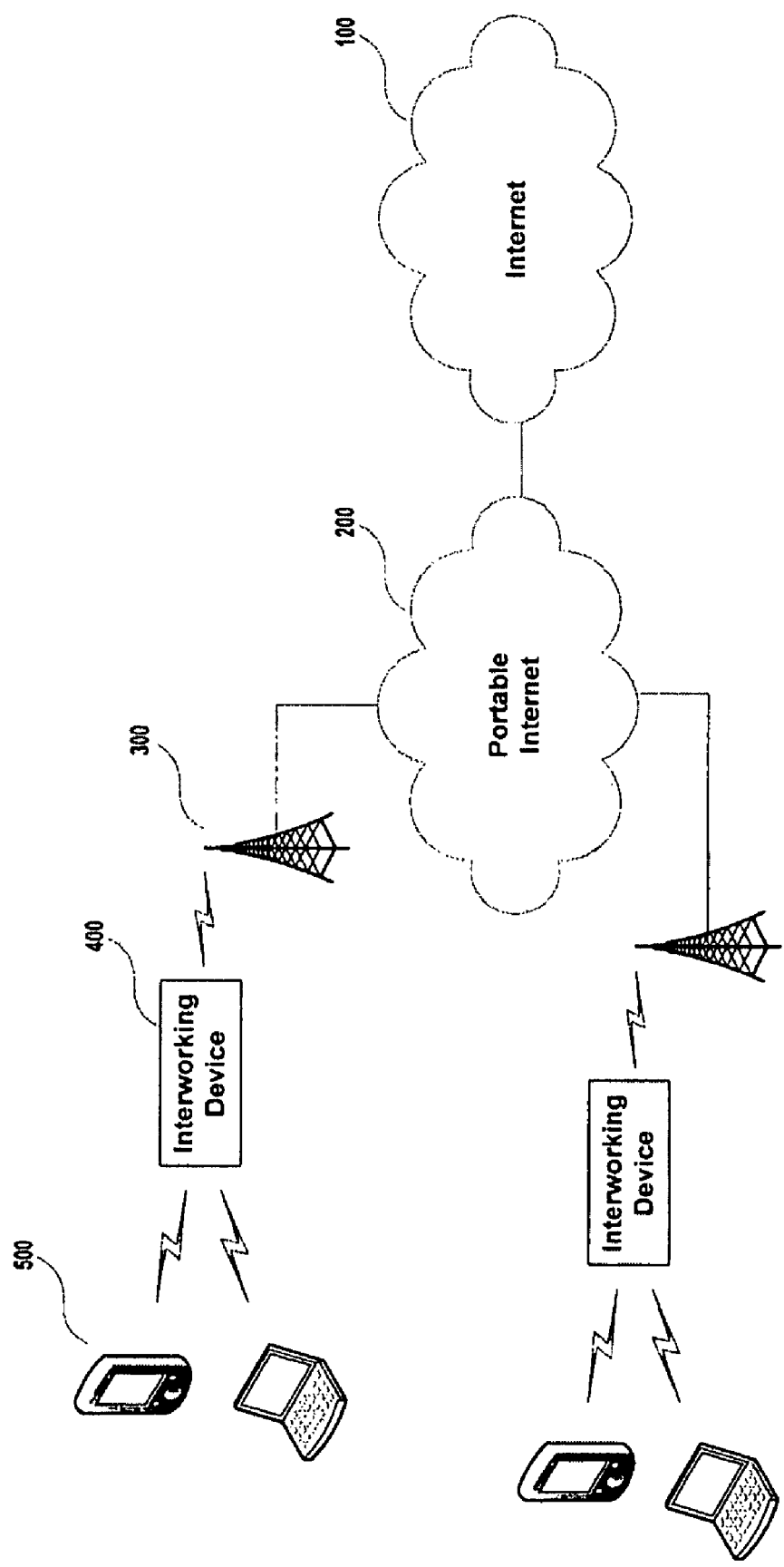
FIG. 2 shows a system for interworking a wireless local area network (WLAN) and a portable Internet according to an exemplary embodiment of the present invention.

FIG. 2 shows a system for interworking a wireless local area network (WLAN) and a portable Internet according to an exemplary embodiment of the present invention.

As shown in FIG. 2, the interworking device applied system includes an Internet 100, a portable Internet 200, a base station 300, and an interworking device 400, and communicates with a terminal 500 through the radio channel.

The Internet 100 communicates with the portable Internet 200 through a cable channel, and transmits/receives data to/from the terminal 500 through the portable Internet 200 and the interworking device 400. The Internet 100 is a network for providing various types of services including e-mail, telnet, FTP, Gopher, and the world wide web (WWW).

The portable Internet 200 controls the base station 300, and connects the Internet 100 and the interworking device 400 by communicating with the interworking device 400 through the base station 300. The portable Internet 200 is a network for providing a service that allows usage of the very fast Internet during movement anytime and anywhere, and it can be expressed as a wireless portable Internet, a wireless wideband Internet, a wireless very fast Internet, and WiBro.

The base station 300 communicates with the interworking device 400 through the radio channel according to control by the portable Internet 200.

The interworking device 400 communicates with the portable Internet 200 through the base station 300, and communicates with the Internet 100 through the portable Internet 200. In this instance, the portable Internet 200 can sense the interworking device 400 to be a portable Internet terminal.

The terminal 500 communicates with the interworking device 400 through the radio channel, and transmits/receives data to/from the Internet 100 through the portable Internet 200 and the interworking device 400. In this instance, the terminal 500 can access the wireless Internet through the interworking device 400, and can sense the interworking device 400 to be a WLAN AP.

A system to which an interworking device is applied according to an exemplary embodiment of the present invention will now be described with reference to FIG. 3.

Figure 3:
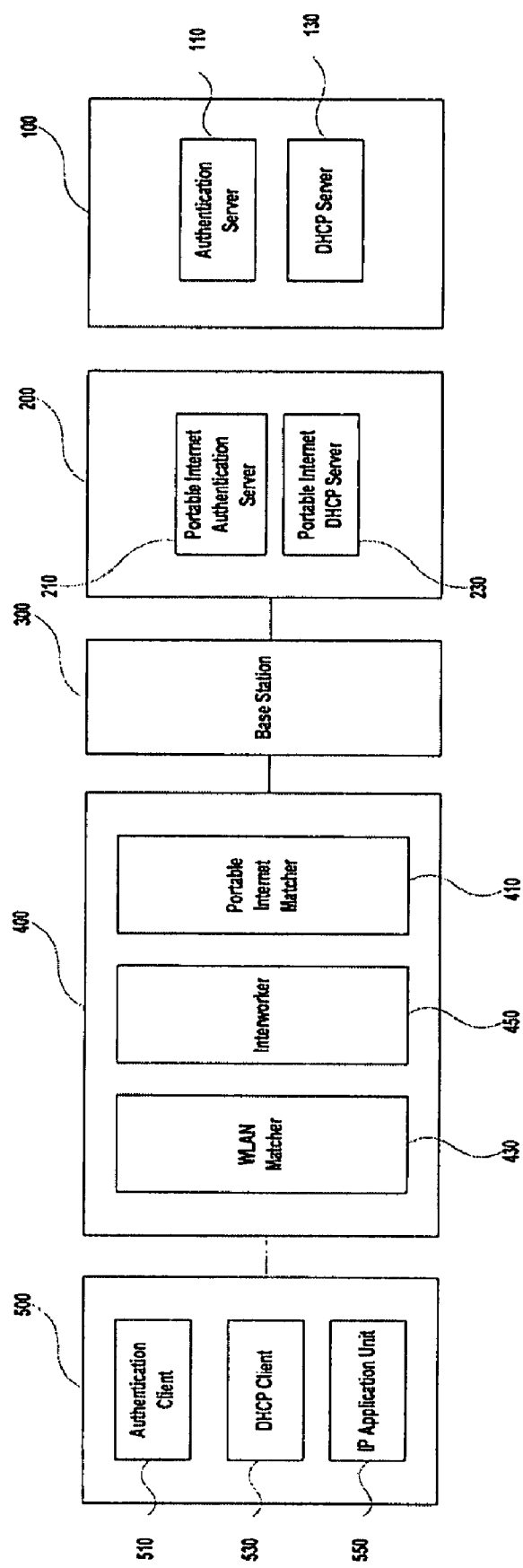
FIG. 3 is a schematic diagram of a system for interworking a wireless local area network (WLAN) and a portable Internet according to an exemplary embodiment of the present invention.

FIG. 3 is a schematic diagram of a system for interworking a wireless local area network (WLAN) and a portable Internet according to an exemplary embodiment of the present invention.

As shown in FIG. 3, the interworking device applied system includes the Internet 100, the portable Internet 200, the base station 300, and the interworking device 400, and communicates with the terminal 500 through a radio channel.

The Internet 100 includes an AAA server 110 for authenticating the terminal connected to the Internet, and a DHCP server 130 for allocating a network address to the terminal authenticated by the authentication server 110.

The portable Internet 200 includes a portable Internet authentication server 210 for authenticating the portable Internet terminal connected to the portable Internet, and a portable Internet DHCP server 230 for allocating a network address to the portable Internet terminal authenticated by the portable Internet authentication server 210.

The base station 300 communicates with the interworking device 400 through a radio channel according to control by the portable Internet 200.

The interworking device 400 includes a portable Internet matcher 410 for accessing the portable Internet 200 through the portable Internet terminal and communicating with the portable Internet 200, a WLAN matcher 430 for functioning as a WLAN AP to the terminal accessing the interworking device 400, and an interworker 450 for interworking the portable Internet matcher 410 and the WLAN matcher 430 to provide an authentication function and an address allocation function.

The terminal 500 includes an authentication client 510 for requesting authentication on the terminal 500, a DHCP client 530 for requesting a network address for the terminal 500, and an IP application unit 550 for communicating with the interworking device 400 according to the network address allocated to the terminal 500. In this instance, the authentication client 510 can request authentication of the terminal 500 through an authentication message, and the DHCP client 530 can request an IP address for the terminal 500 through a DHCP message.

A portable Internet matcher of the interworking device according to an exemplary embodiment of the present invention will now be described with reference to FIG. 4.

Figure 4:
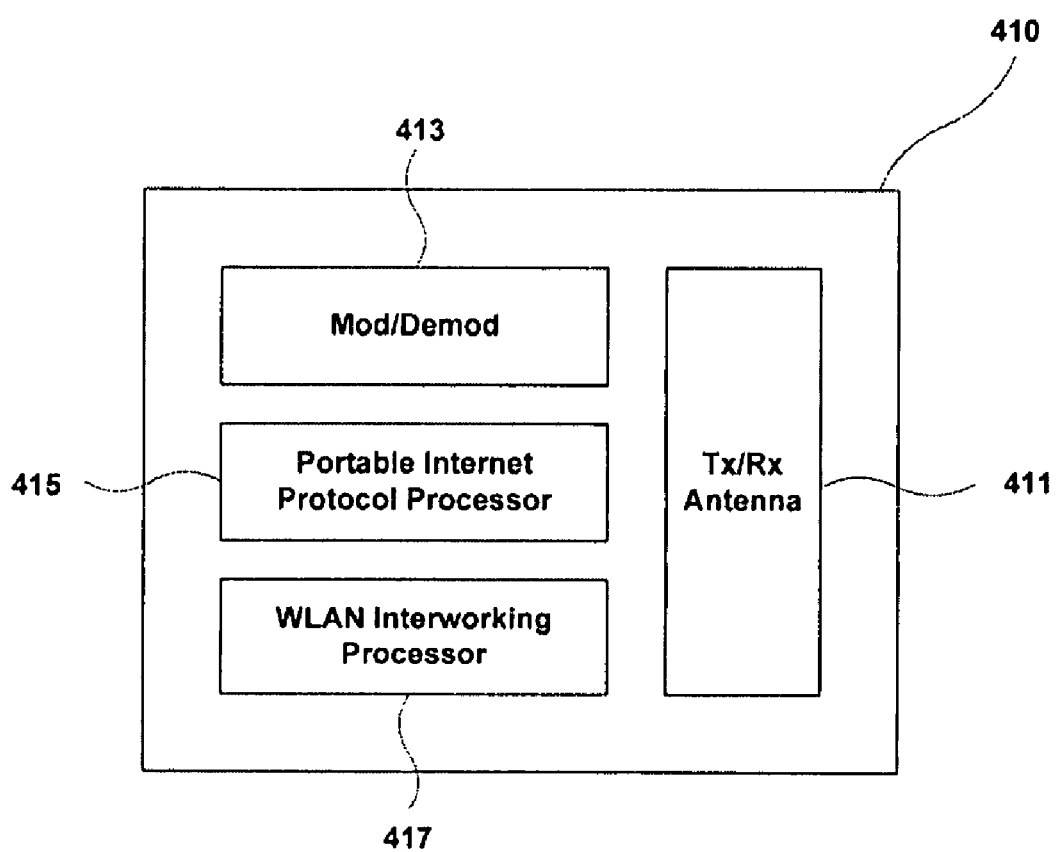
FIG. 4 shows a schematic diagram for a portable Internet matcher according to an exemplary embodiment of the present invention.

FIG. 4 shows a schematic diagram for a portable Internet matcher according to an exemplary embodiment of the present invention.

As shown in FIG. 4, the portable Internet matcher 410 includes a transmit/receive antenna 411, a modulation/demodulation unit 413, a portable Internet protocol processor 415, and a WLAN interworking processor 417.

The transmit/receive antenna 411 transmits signals to a radio channel, and receives the signals transmitted through the radio channel.

The modulation/demodulation unit 413 modulates digital signals into analog signals, and demodulates analog signals into digital signals. The modulation/demodulation unit 413 can be described by the term "modem".

The portable Internet protocol processor 415 processes the portable Internet protocol.

The WLAN interworking processor 417 processes the interworking with the WLAN matcher 430.

A WLAN matcher of the interworking device according to an exemplary embodiment of the present invention will now be described with reference to FIG. 5.

Figure 5:
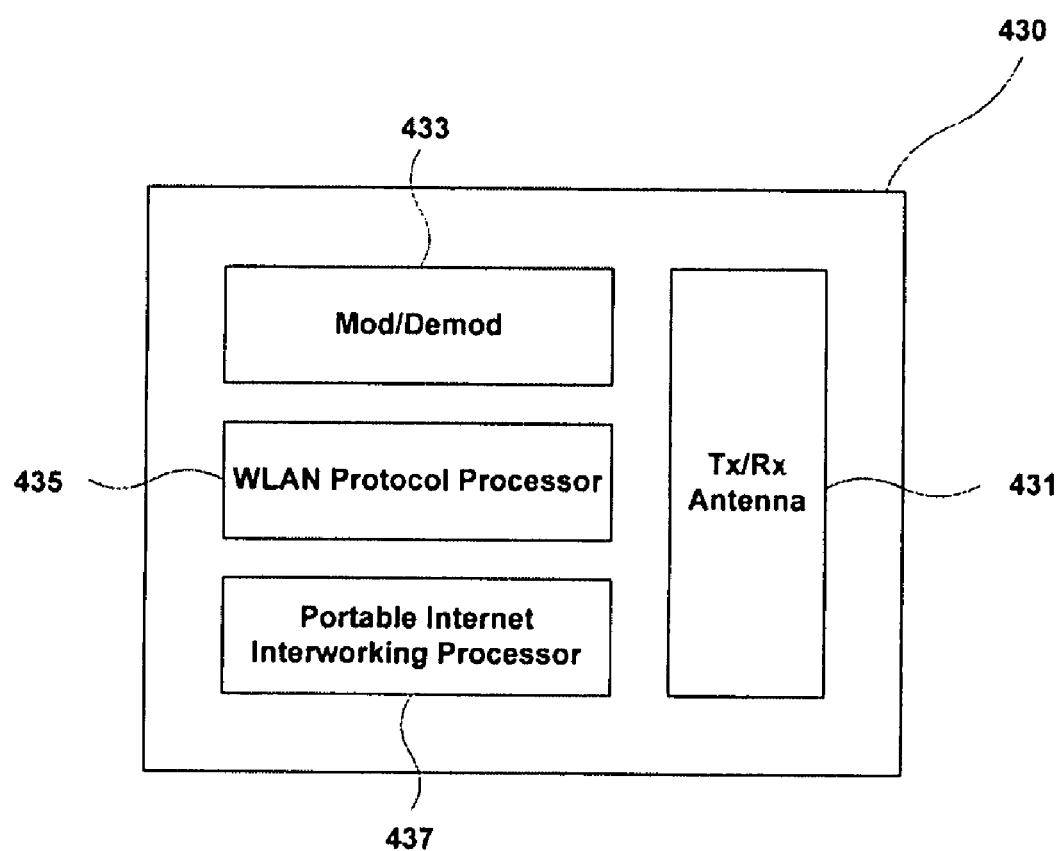
FIG. 5 shows a schematic diagram for a wireless local area network (WLAN) matcher according to an exemplary embodiment of the present invention.

FIG. 5 shows a schematic diagram for a wireless local area network (WLAN) matcher according to an exemplary embodiment of the present invention.

As shown in FIG. 5, the WLAN matcher 430 includes a transmit/receive antenna 431, a modulation/demodulation unit 433, a WLAN AP protocol processor 435, and a portable Internet interworking processor 437.

The transmit/receive antenna 431 transmits signals to a radio channel, and receives signals transmitted through the radio channel.

The modulation/demodulation unit 433 modulates digital signals into analog signals, and demodulates analog signals into digital signals. The modulation/demodulation unit 433 can be described by the term "modem."

The WLAN AP protocol processor 435 processes the WLAN AP protocol.

The portable Internet interworking processor 437 processes the interworking with the portable Internet matcher 410.

An interworker of the interworking device according to an exemplary embodiment of the present invention will now be described with reference to FIG. 6.

Figure 6:
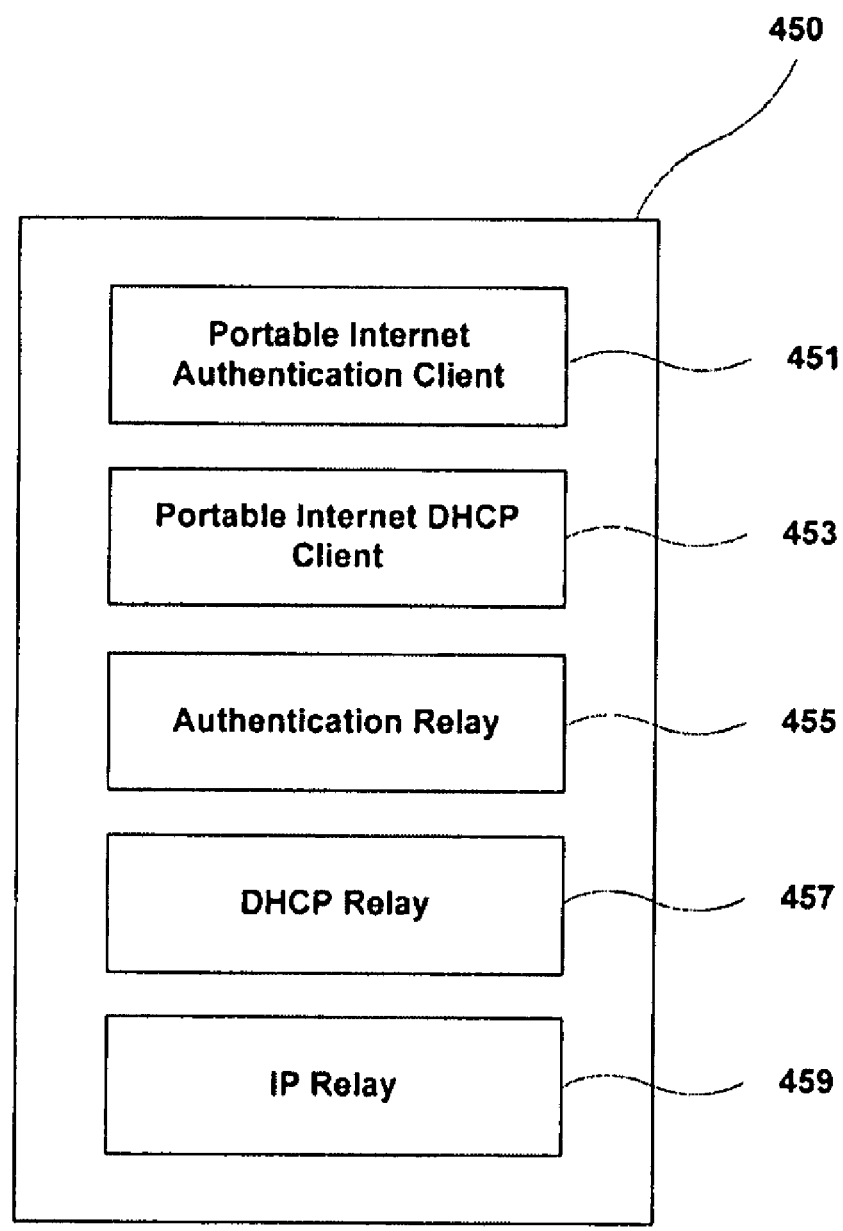
FIG. 6 shows a schematic diagram for an interworker according to an exemplary embodiment of the present invention.

FIG. 6 shows a schematic diagram for an interworker according to an exemplary embodiment of the present invention.

As shown in FIG. 6, the interworker 450 includes a portable Internet authentication client 451, a portable Internet DHCP client 453, an authentication relay 455, a DHCP relay 457, and an Internet protocol (IP) relay 459.

The portable Internet authentication client 451 requests to authenticate the portable Internet matcher 410 of the interworking device 400 from the portable Internet 200. In this instance, the portable Internet authentication client 451 can request authentication from the portable Internet 200 through a portable Internet authentication message.

The portable Internet DHCP client 453 requests the portable Internet 200 to allocate a network address for the portable Internet matcher 410 of the interworking device 400. In this instance, the portable Internet DHCP client 453 can request the portable Internet 200 to allocate a network address through a DHCP message.

When the WLAN matcher 430 receives an authentication message corresponding to the authentication request of the terminal 500, the authentication relay 455 transmits the received authentication message to the portable Internet matcher 410, and when the portable Internet matcher 410 receives an authentication response message corresponding to the authentication message, the authentication relay 455 transmits the received authentication response message to the WLAN matcher 430.

When the WLAN matcher 430 receives a DHCP message corresponding to an address allocation request of the terminal 500, the DHCP relay 457 transmits the received DHCP message to the portable Internet matcher 410, and when the portable Internet matcher 410 receives a DHCP response message corresponding to the DHCP message, the DHCP relay 457 transmits the received DHCP response message to the WLAN matcher 430.

The IP relay 459 transmits the data received by the portable Internet matcher 410 to the WLAN matcher 430, and transmits the data received by the WLAN matcher 430 to the portable Internet matcher 410. In this instance, when transmitting the data to the portable Internet matcher 410, the IP relay 459 can convert the data into the format of the portable Internet 200, and when transmitting the data to the WLAN matcher 430, the IP relay 459 can convert the data into the format of the terminal 500.

A method for a system to which an interworking device is applied according to an exemplary embodiment of the present invention to perform a signaling process by using a tunneling mode will now be described with reference to FIG. 7.

Figure 7:
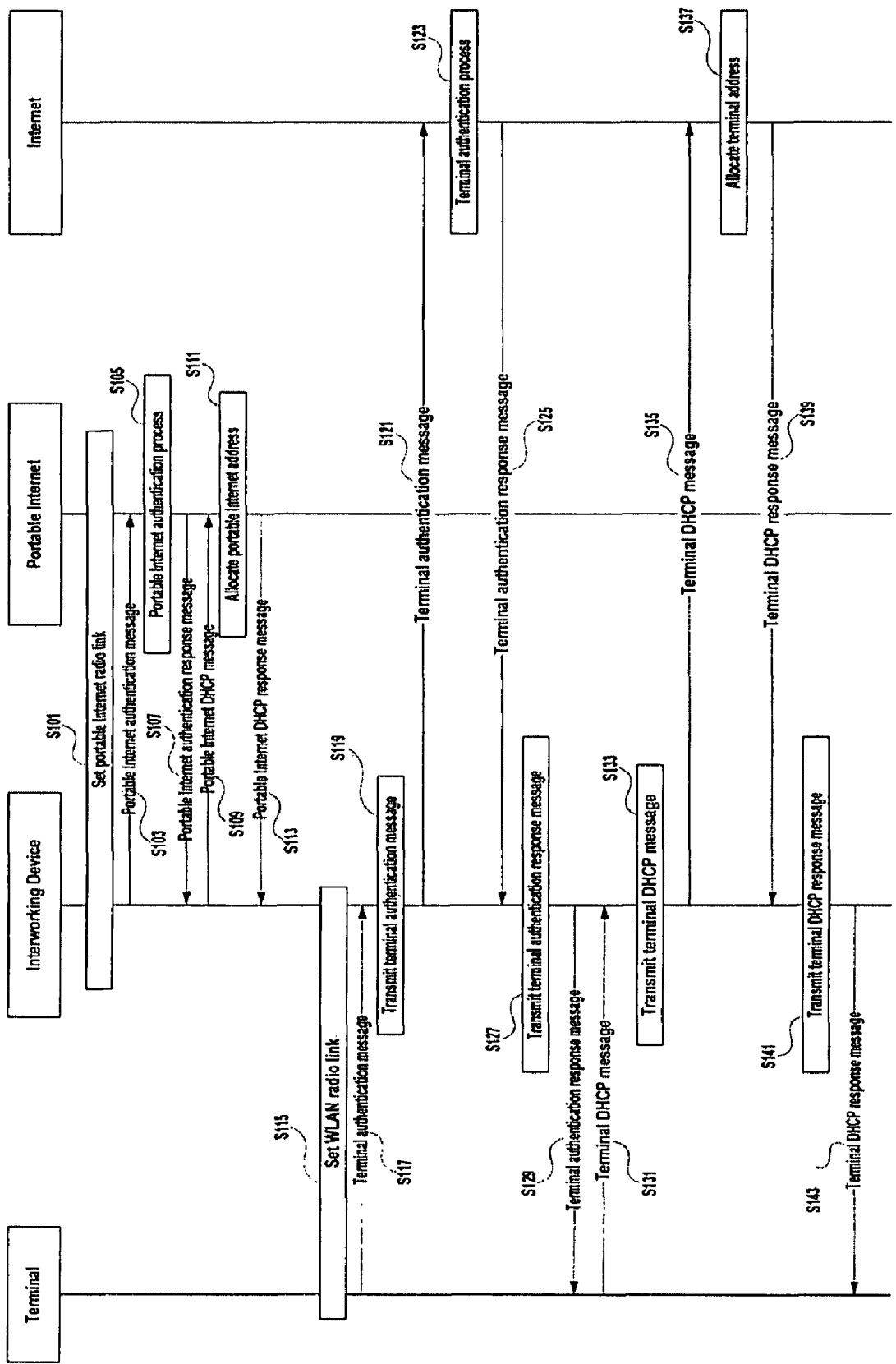
FIG. 7 shows a flowchart of a method for a system to which an interworking device is applied according to an exemplary embodiment of the present invention to perform signaling in a tunneling mode.

FIG. 7 shows a flowchart of a method for a system to which an interworking device is applied according to an exemplary embodiment of the present invention to perform signaling in a tunneling mode.

As shown in FIG. 7, the interworking device 400 sets the portable Internet 200 and the portable Internet radio link (S101). In this instance, the portable Internet 200 is connected to the base station 300 through a cable, and the interworking device 400 can set a portable Internet radio link when the portable Internet matcher 410 of the interworking device 400 sets a radio link with the base station 300. Also, the portable Internet radio link can follow the portable Internet protocol defined by IEEE 802.16, and the portable Internet communication protocol supports the handover for the terminal.

The interworking device 400 transmits a portable Internet authentication message to the portable Internet 200 (S103). The portable Internet authentication client 451 of the interworking device 400 controls the portable Internet 200 to authenticate the portable Internet matcher 410 of the interworking device 400 through a portable Internet authentication message. In this instance, the portable Internet matcher 410 can transmit the portable Internet authentication message to the portable Internet authentication server 210 of the portable Internet 200 through a portable Internet radio link.

The portable Internet authentication server 210 of the portable Internet 200 performs a portable Internet authentication process according to the portable Internet authentication message (S105). The portable Internet authentication process is variable depending on the characteristics of the portable Internet 200. In this instance, the portable Internet 200 senses the portable Internet matcher 410 of the interworking device 400 to be a portable Internet terminal and performs the authentication process.

The portable Internet 200 transmits a portable Internet authentication response message to the interworking device 400 in response to the portable Internet authentication message (S107). In this instance, the interworker 450 of the interworking device 400 sets a portable Internet data path between the portable Internet matcher 410 and the portable Internet 200 according to the portable Internet authentication response message. Also, the interworking device 400 can set the portable Internet data path according to the portable Internet communication defined by the IEEE 802.16.

The interworking device 400 transmits a portable Internet DHCP message to the portable Internet 200 (S109). The portable Internet DHCP client 453 of the interworking device 400 requests the portable Internet 200 to allocate a network address for the portable Internet matcher 400 through the portable Internet DHCP message. In this instance, the portable Internet matcher 410 can transmit the portable Internet DHCP message to the portable Internet DHCP server 230 of the portable Internet 200 through the portable Internet data path.

The portable Internet 200 allocates a network address of the interworking device 400 according to the portable Internet DHCP message (S111). The portable Internet DHCP server 230 of the portable Internet 200 allocates a network address for the portable Internet matcher 410. In this instance, the portable Internet DHCP server 230 can allocate an IP address corresponding to the network address.

The portable Internet 200 transmits a portable Internet DHCP response message to the interworking device 400 in response to the portable Internet DHCP message (S113). The portable Internet DHCP response message includes an IP address that is allocated to the portable Internet matcher 410 by the portable Internet DHCP server 230.

The terminal 500 sets a WLAN radio link with the interworking device 400 (S115). The terminal 500 sets a WLAN radio link with the WLAN matcher 430 of the interworking device 400. In this instance, the WLAN radio link can follow the WLAN communication protocol defined by the IEEE 802.11, and the WLAN communication protocol does not support the handover for the terminal.

The terminal 500 transmits a terminal authentication message to the interworking device 400 (S117). The authentication client 510 of the terminal 500 transmits a terminal authentication message to the WLAN matcher 430 of the interworking device 400 through the WLAN radio link.

The WLAN matcher 430 of the interworking device 400 receives the terminal authentication message, and transmits the terminal authentication message to the interworker 450 (S119).

The interworker 450 of the interworking device 400 transmits the terminal authentication message to the Internet 100 (S121). The authentication relay 455 of the interworker 450 transmits the terminal I<authentication message to the authentication server 110 of the Internet 100. The authentication relay 455 transmits the terminal authentication message to the Internet 100 connected to the portable Internet 200 through the portable Internet data path by passing it through the portable Internet 200. In this instance, when the portable Internet matcher 410 has a dedicated access in addition to the portable Internet 200, the authentication relay 455 detects an MAC address of the authentication server 110 to rewrite the terminal authentication message in the MAC packet format and transmits the same to the authentication server 110.

The Internet 100 performs an authentication process according to the terminal authentication message (S123). The authentication process for the terminal 500 is variable according to the characteristics of the Internet 100.

The Internet 100 transmits a terminal authentication response message to the interworking device 400 in response to the terminal authentication message (S125). The Internet 100 transmits the terminal authentication response message to the interworking device 400 through the portable Internet data path by passing it through the portable Internet 200.

The portable Internet matcher 410 of the interworking device 400 receives the terminal authentication response message, and the portable Internet matcher 410 transmits the terminal authentication response message to the interworker 450 (S127).

The interworker 450 of the interworking device 400 transmits the terminal authentication response message to the terminal 500 (S129). The authentication relay 455 of the interworker 450 transmits the terminal authentication response message to the terminal 500 through the WLAN radio link. The interworker 450 of the interworking device 400 sets a WLAN data path between the WLAN matcher 430 and the terminal 500 according to the terminal authentication response message. Also, the interworking device 400 can set the WLAN data path according to the WLAN communication protocol defined by the IEEE 802.11. The authentication process for the terminal 500 is then finished.

The terminal 500 transmits a terminal DHCP message to the interworking device 400 (S131). The DHCP client 530 of the terminal 500 transmits the terminal DHCP message to the WLAN matcher 430 of the interworking device 400 through the WLAN data path.

The WLAN matcher 430 of the interworking device 400 receives the terminal DHCP message, and the WLAN matcher 430 transmits the terminal DHCP message to the interworker 450 (S133).

The interworker 450 of the interworking device 400 transmits the terminal DHCP message to the Internet 100 (S135). The DHCP relay 457 of the interworker 450 transmits the terminal DHCP message to the DHCP server 130 of the Internet 100. The DHCP relay 457 transmits the terminal DHCP message to the Internet 100 connected to the portable Internet 200 through the portable Internet data path by passing it through the portable Internet 200. In this instance, the DHCP relay 457 can transmit the terminal DHCP message to the Internet 100 by using a dedicated access for transmitting the terminal authentication message. Also, the DHCP relay 457 can set a destination address of the terminal DHCP message to be an address of the DHCP server 130 so as to directly transmit the terminal DHCP message to the DHCP server 130 of the Internet 100.

The Internet 100 allocates a network address of the terminal 500 according to the terminal DHCP message (S137). The DHCP server 130 of the Internet 100 allocates the network address of the terminal 500 according to the terminal DHCP message. In this instance, the DHCP server 130 can allocate the IP address corresponding to the network address.

The Internet 100 transmits the terminal DHCP response message to the interworking device 400 in response to the terminal DHCP message (S139). The Internet 100 transmits the terminal DHCP response message to the interworking device 400 through the portable Internet data path by passing it through the portable Internet 200.

The portable Internet matcher 410 of the interworking device 400 receives the terminal DHCP response message, and the portable Internet matcher 410 transmits the terminal DHCP response message to the interworker 450 (S141).

The interworker 450 of the interworking device 400 transmits the terminal DHCP response message to the terminal 500 (S143). The DHCP relay 457 of the interworker 450 transmits the terminal DHCP response message to the terminal 500 through a WLAN data path. The signaling for the terminal 500 is finished through the above-noted process.

A method for a system to which an interworker is applied according to an exemplary embodiment of the present invention to perform signaling in a routing mode will be described with reference to FIG. 8.

Figure 8:
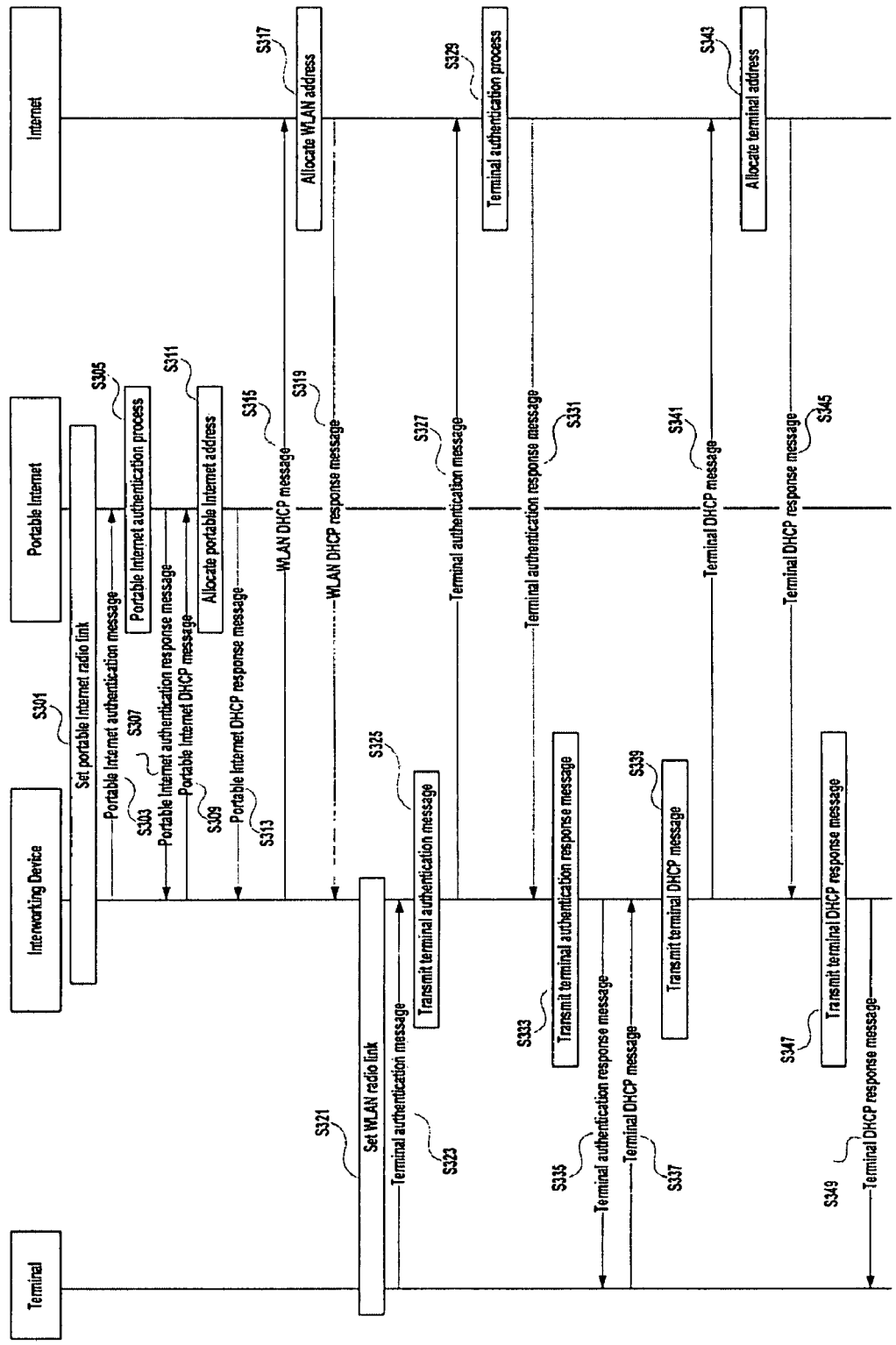
FIG. 8 shows a flowchart of a method for a system to which an interworking device is applied according to an exemplary embodiment of the present invention to perform signaling in a routing mode.

FIG. 8 shows a flowchart of a method for a system to which an interworker is applied according to an exemplary embodiment of the present invention to perform signaling in a routing mode.

As shown in FIG. 8, the interworking device 400 sets a portable Internet radio link with the portable Internet 200 (S301). In this instance, the portable Internet 200 is connected to the base station 300 through a cable, and the interworking device 400 can set the portable Internet radio link when the portable Internet matcher 410 of the interworking device 400 sets a radio link with the base station 300. Also, the portable Internet radio link can follow the portable Internet communication protocol defined by the IEEE 802.16, and the portable Internet communication protocol supports the handover for the terminal.

The interworking device 400 transmits the portable Internet authentication message to the portable Internet 200 (S303). The portable Internet authentication client 451 of the interworking device 400 controls the portable Internet 200 to authenticate the portable Internet matcher 410 of the interworking device 400 through the portable Internet authentication message. In this instance, the portable Internet matcher 410 can transmit the portable Internet authentication message to the portable Internet authentication server 210 of the portable Internet 200 through the portable Internet radio link.

The portable Internet authentication server 210 of the portable Internet 200 performs a portable Internet authentication process according to the portable Internet authentication message (S305). The portable Internet authentication process is variable depending on the characteristics of the portable Internet 200. In this instance, the portable Internet 200 senses the portable Internet matcher 410 of the interworking device 400 to be a portable Internet terminal and performs an authentication process.

The portable Internet 200 transmits the portable Internet authentication response message to the interworking device 400 in response to the portable Internet authentication message (S307). In this instance, the interworker 450 of the interworking device 400 sets a portable Internet data path between the portable Internet matcher 410 and the portable Internet 200 according to the portable Internet authentication response message. Also, the interworking device 400 can set the portable Internet data path according to the portable Internet communication protocol defined by the IEEE 802.16.

The interworking device 400 transmits the portable Internet DHCP message to the portable Internet 200 (S309). The portable Internet DHCP client 453 of the interworking device 400 requests the portable Internet 200 to allocate a network address for the portable Internet matcher 400 through the portable Internet DHCP message. In this instance, the portable Internet matcher 410 can transmit the portable Internet DHCP message to the portable Internet DHCP server 230 of the portable Internet 200 through the portable Internet data path.

The portable Internet DHCP server 230 of the portable Internet 200 allocates a network address of the interworking device 400 according to the portable Internet DHCP message of the portable Internet 200 (S311). The portable Internet DHCP server 230 allocates a network address for the portable Internet matcher 410. In this instance, the portable Internet DHCP server 230 can allocate an IP address corresponding to the network address.

The portable Internet 200 transmits the portable Internet DHCP response message to the interworking device 400 in response to the portable Internet DHCP message (S313). The portable Internet DHCP response message includes an IP address allocated for the portable Internet matcher 410 by the portable Internet DHCP server 230.

The interworker 450 of the interworking device 400 transmits the WLAN DHCP message to the Internet 100 (S315). The IP relay 459 of the interworker 450 requests the Internet 100 to allocate a network address for the WLAN matcher 430 of the interworking device 400 through the WLAN DHCP message. The IP relay 459 transmits the WLAN DHCP message to the Internet 100 connected to the portable Internet 200 through the portable Internet data path by passing it through the portable Internet 200.

The Internet 100 allocates a network address for the interworking device 400 according to the WLAN DHCP message (S317). The DHCP server 130 of the Internet 100 allocates a network address for the WLAN matcher 430 of the interworking device 400 according to the WLAN DHCP message. In this instance, the DHCP server 130 can allocate an IP address corresponding to the network address.

The Internet 100 transmits the WLAN DHCP response message to the interworking device 400 in response to the WLAN DHCP message (S319). The Internet 100 transmits the WLAN DHCP response message to the portable Internet matcher 410 of the interworking device 400 through the portable Internet data path by passing it through the portable Internet 200. The portable Internet matcher 410 transmits the WLAN DHCP response message to the IP relay 459 of the interworker 450 to finish the network address allocation for the WLAN matcher 430 of the interworking device 400.

The terminal 500 sets a WLAN radio link with the interworking device 400 (S321). The terminal 500 sets a WLAN radio link with the WLAN matcher 430 of the interworking device 400. In this instance, the WLAN radio link can follow the WLAN communication protocol defined by the IEEE 802.11, and the WLAN communication protocol does not support the handover for the terminal.

The terminal 500 transmits the terminal authentication message to the interworking device 400 (S323). The authentication client 510 of the terminal 500 transmits the terminal authentication message to the WLAN matcher 430 of the interworking device 400 through the WLAN radio link.

The WLAN matcher 430 receives the terminal authentication message, and transmits the terminal authentication message to the interworker 450 (S325).

The interworker 450 transmits the terminal authentication message to the Internet 100 (S327). The authentication relay 455 of the interworker 450 transmits the terminal authentication message to the authentication server 110 of the Internet 100. The authentication relay 455 transmits the terminal authentication message to the Internet 100 connected to the portable Internet 200 through the portable Internet data path by passing it through the portable Internet 200. In this instance, when the portable Internet matcher 410 has a dedicated access other than the portable Internet 200, the authentication relay 455 rewrites the terminal authentication message in the IP packet format in which the IP address of the authentication server 110 is designated as a destination address and the IP address of the WLAN matcher 430 is designated as a departure address, and transmits the rewritten message to the authentication server. Also, the IP relay 459 functions as a router to set a data path so that the authentication relay 455 may transmit the terminal authentication message in the IP packet format to the Internet 100 through the portable Internet 200.

The Internet 100 performs an authentication process according to the terminal authentication message (S329). In this instance, the authentication process for the terminal 500 is variable depending on the characteristics of the Internet 100.

The Internet 100 transmits the terminal authentication response message to the interworking device 400 in response to the terminal authentication message (S331). The Internet 100 transmits the terminal authentication response message to the interworking device 400 through the radio link between the portable Internet 200 and the portable Internet matcher 410 by passing it through the portable Internet 200. The Internet 100 can designate the destination address of the terminal authentication response message as an IP address of the WLAN matcher 430. Also, the portable Internet 200 can function as a router.

The portable Internet matcher 410 of the interworking device 400 receives the terminal authentication response message, and the portable Internet matcher 410 transmits the terminal authentication response message to the interworker 450 (S333).

The interworker 450 of the interworking device 400 transmits the terminal authentication response message to the terminal 500 (S335). The authentication relay 455 of the interworker 450 transmits the terminal authentication response message to the terminal 500 through the WLAN radio link. In this instance, the interworker 450 of the interworking device 400 sets the WLAN data path between the WLAN matcher 430 and the terminal 500 according to the terminal authentication response message. Also, the interworking device 400 can set the WLAN data path according to the WLAN communication protocol defined by the IEEE 802.11. The authentication process for the terminal 500 is then finished.

The terminal 500 transmits the terminal DHCP message to the interworking device 400 (S337). The DHCP client 530 of the terminal 500 transmits the terminal DHCP message to the WLAN matcher 430 of the interworking device 400 through the WLAN data path.

The WLAN matcher 430 of the interworking device 400 receives the terminal DHCP message, and transmits the terminal DHCP message to the interworker 450 (S339).

The interworker 450 of the interworking device 400 transmits the terminal DHCP message to the Internet 100 (S341). The DHCP relay 457 of the interworker 450 transmits the terminal DHCP message to the DHCP server 130 of the Internet 100. The DHCP relay 457 transmits the terminal DHCP message to the Internet 100 connected to the portable Internet 200 through the portable Internet data path by passing it through the portable Internet 200. The DHCP relay 457 can transmit the terminal DHCP message to the Internet 100 by using a dedicated access that is generated so as to transmit the terminal authentication message. Also, the DHCP relay 457 can set the destination address of the terminal DHCP message as an address of the DHCP server 130 so as to directly transmit the terminal DHCP message to the DHCP server 130 of the Internet 100. Also, the IP relay 459 functions as a router to set a data path so that the DHCP relay 455 may the terminal DHCP message in the IP packet format to the Internet 100 through the portable Internet 200.

The Internet 100 allocates a network address of the terminal 500 according to the terminal DHCP message (S343). The DHCP server 130 of the Internet 100 allocates the network address of the terminal 500 according to the terminal DHCP message. In this instance, the DHCP server 130 can allocate an IP address corresponding to the network address.

The Internet 100 transmits the terminal DHCP response message to the interworking device 400 in response to the terminal DHCP message (S345). The Internet 100 transmits the terminal DHCP response message to the interworking device 400 through the portable Internet data path by passing it through the portable Internet 200. In this instance, the Internet 100 can designate the destination address of the terminal authentication response message as an IP address of the WLAN matcher 430. Also, the portable Internet 200 can function as a router.

The portable Internet matcher 410 of the interworking device 400 receives the terminal DHCP response message, and the portable Internet matcher 410 transmits the terminal DHCP response message to the interworker 450 (S347).

The interworker 450 of the interworking device 400 transmits the terminal DHCP response message to the terminal 500 (S349). The DHCP relay 457 of the interworker 450 transmits the terminal DHCP response message to the terminal 500 through the WLAN data path. The signaling for the terminal 500 is finished through the above-noted process.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the present invention, the WLAN terminal can access the WLAN AP to receive a WLAN service without any change, and can access the interworking device and use the fast mobility of the portable Internet to receive an Internet service during movement.

What is claimed is:

1. A method for an interworking device to interwork with a first network to support signaling between a terminal and a second network, the method comprising:
    setting, with the first network, a first wireless data path following a first wireless communication protocol;
    setting a first radio link following a second wireless communication protocol with the terminal;
    receiving an authentication message through the first radio link;
    transmitting the authentication message to an authentication server of the second network through the first wireless data path so that the authentication server of the second network may perform an authentication process for the terminal;
    setting a second wireless data path following the second wireless communication protocol with the terminal when the authentication process performed by the authentication server of the second network is finished;
    after the setting of the second wireless data path, receiving a first address allocation message from the terminal through the second wireless data path;
    transmitting the first address allocation message to an address allocation server of the second network through the first wireless data path so that the address allocation server of the second network may allocate a first network address for the terminal;
    receiving the first network address through the first wireless data path; and
    transmitting the first network address to the terminal through the second wireless data path.

2. The method of claim 1, wherein
the first wireless communication protocol supports a handover, and the second wireless communication protocol does not support a handover.

3. The method of claim 2, wherein the method comprises:
    transmitting a second address allocation message to an address allocation server of the first network through the first wireless data path to allow the address allocation server of the first network to allocate a second network address; and
    receiving the second network address through the first wireless data path.

4. The method of claim 3, wherein
the setting of the first wireless data path comprises:
    setting a second radio link following the first wireless communication protocol with a base station of the first network;
    transmitting a first network authentication message to an authentication server of the first network through the second radio link to allow the authentication server of the first network to perform an authentication process; and
    setting the first wireless data path following the first wireless communication protocol with the first network when the authentication process performed by the authentication server of the first network is finished.

5. The method of claim 3, wherein
the transmitting of the authentication message to the authentication server of the second network comprises transmitting the authentication message to the authentication server of the second network through the first wireless data path by passing it through the first network, and
the transmitting of the first address allocation message to the address allocation server of the second network comprises transmitting the first address allocation message to the address allocation server of the second network through the first wireless data path by passing it through the first network.

6. The method of claim 2, wherein the method comprises:
    transmitting a second address allocation message to an address allocation server of the first network through the first wireless data path to allow the address allocation server of the first network to allocate a second network address;
    receiving the second network address through the first wireless data path;
    transmitting a third address allocation message to the address allocation server of the second network through the first wireless data path by passing it through the first network to allow the address allocation server of the second network to allocate a third network address; and
    receiving the third network address through the first wireless data path.

7. The method of claim 6, wherein
the setting of the first wireless data path comprises:
    setting a second radio link following the first wireless communication protocol with a base station of the first network;

transmitting a first network authentication message to an authentication server of the first network through the second radio link to allow the authentication server of the first network to perform an authentication process; and setting the first wireless data path following the first wireless communication protocol with the first network when the authentication process performed by the authentication server of the first network is finished.

8. The method of claim 6, wherein
the transmitting of the authentication message to the second network comprises designating a destination address of the authentication message as a network address of the authentication server of the second network, and designating a path so that the authentication message may be passed through the first network through the first wireless data path.

9. The method of claim 6, wherein
the transmitting of the first address allocation message to the address allocation server of the second network comprises designating a destination address of the address allocation message as a network address of the address allocation server of the second network, and setting a path so that the first address allocation message may be passed through the first network through the first wireless data path.

10. A system for interworking a first network to connect a second network to a terminal, the system comprising:
a base station connected to the first network through a cable, and transmitting/receiving signals through a radio channel;
a first network authentication server for performing an authentication process for the first network;
a second network authentication server, distinct from the first network authentication server, for performing an authentication process for the second network; and
an interworking device comprising a first matcher, a second matcher and an interworker,
wherein the first matcher transmits a first authentication message to the first network authentication server according to control by the interworker, and sets a first wireless data path following a first wireless communication protocol with the first network when the first network authentication server finishes an authentication process according to the first authentication message, and
the second matcher receives a second authentication message from the terminal, transmits the second authentication message to the second network authentication server through the interworker by passing it through the first network, and sets a second wireless data path following a second wireless communication protocol with the terminal when the second network authentication server finishes an authentication process according to the second authentication message.

11. The system of claim 10, wherein the system comprises:
a first network address allocation server for allocating a first network address for the interworking device; and
a second network address allocation server for allocating a second network address for the terminal.

12. The system of claim 11, wherein
the interworker comprises:
an authentication client for requesting the first network authentication server to authenticate the first matcher through the first authentication message; and
an authentication relay for transmitting the second authentication message to the second network authentication server through the first wireless data path by passing it through the first network.

13. The system of claim 12, wherein
the interworker comprises:
an address allocation client for requesting the first network address allocation server to allocate a network address for the first matcher through the first wireless data path; and
an address allocation relay for transmitting an address allocation message to the second network address allocation server through the first wireless data path by passing it through the first network when the second matcher receives the address allocation message from the terminal through the second wireless data path.

14. The system of claim 10, wherein after the setting of the second wireless data path, the second matcher receives a first address allocation message from the terminal through the second wireless data path, transmits the first address allocation message to an address allocation server of the second network through the interworker by passing it through the first wireless data path so that the address allocation server of the second network may allocate a first network address for the terminal, and
wherein the first matcher receives the first network address through the first wireless data path, and transmitting the first network address to the terminal through the interworker by passing it through the second wireless data path.

* * * * *